United States Patent (10) Patent No.: US 10,250,576 B2
Camenisch et al. (45) Date of Patent: *Apr. 2, 2019

(54) COMMUNICATION OF MESSAGES OVER NETWORKS

(71) Applicant: International Business Machines Corporation, Armonk, NY (US)

(72) Inventors: Jan Leonhard Camenisch, Thalwil (CH); Kai Samelin, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/427,507

(22) Filed: Feb. 8, 2017

(65) Prior Publication Data

US 2018/0227278 A1 Aug. 9, 2018

(51) Int. Cl.
H04L 29/06 (2006.01)
H04L 9/00 (2006.01)
H04L 9/08 (2006.01)

(52) U.S. Cl.
CPC .......... H04L 63/0442 (2013.01); H04L 9/006 (2013.01); H04L 9/008 (2013.01);
(Continued)

(58) Field of Classification Search
CPC ... H04L 63/06; H04L 63/083; H04L 2209/56; H04L 2209/60
(Continued)

(56) References Cited

U.S. PATENT DOCUMENTS 6,058,188 A * 5/2000 Chandersekaran ... H04L 9/0894
380/286
6,084,968 A * 7/2000 Kennedy ............... G06F 21/602
380/259
(Continued)

FOREIGN PATENT DOCUMENTS

CN 102333308 A 1/2012

OTHER PUBLICATIONS

Lee, Songwon et al. "Threshold password-based authentication using bilinear pairings." EuroPKI. 2004.
(Continued)

*Primary Examiner* — Samson B Lemma
(74) *Attorney, Agent, or Firm* — Harrington & Smith

(57) ABSTRACT

A method is provided for communicating messages between sender and receiver computers, connectable via a network to a system of servers, based on authentication of receiver passwords, associated with respective receiver IDs, by the system. A method is also provided for receiving a message from a sender based on authentication of a receiver password, associated with a receiver ID, by a system of servers, in a network, wherein each server stores for the ID a ciphertext produced by encrypting the receiver password under a public key via a homomorphic threshold encryption scheme having a threshold, and a key-share of a secret key corresponding to that public key, and stores an encrypted message from the sender encrypted under the public key. Systems are provided including servers, for communicating messages between sender and receiver computers based on authentication of receiver passwords, associated with respective receiver IDs, by the system.

19 Claims, 4 Drawing Sheets

(52) U.S. Cl.
CPC ............ *H04L 9/085* (2013.01); *H04L 9/0825* (2013.01); *H04L 63/083* (2013.01)

(58) Field of Classification Search
USPC ........................................................ 713/153
See application file for complete search history.

(56) References Cited

U.S. PATENT DOCUMENTS

| | | | |
|---|---|---|---|
| 6,829,356 | B1 | 12/2004 | Ford |
| 7,146,009 | B2* | 12/2006 | Andivahis ............... H04L 63/06 380/277 |
| 7,359,507 | B2 | 4/2008 | Kaliski |
| 7,725,730 | B2* | 5/2010 | Juels ..................... H04L 63/083 340/5.85 |
| 7,912,213 | B2* | 3/2011 | Rubin ...................... H04L 9/06 380/255 |
| 9,015,489 | B2 | 4/2015 | Belenkiy |
| 9,118,661 | B1 | 8/2015 | Juels |
| 9,258,113 | B2 | 2/2016 | Schneider |
| 9,374,221 | B1 | 6/2016 | Juels |
| 9,515,996 | B1 | 12/2016 | Juels |
| 9,537,658 | B2* | 1/2017 | Camenisch ........... H04L 9/3226 |
| 9,596,086 | B2* | 3/2017 | Camenisch ........... H04L 9/3226 |
| 2002/0067832 | A1 | 6/2002 | Jablon |
| 2003/0147536 | A1* | 8/2003 | Andivahis ............... H04L 63/06 380/277 |
| 2003/0163737 | A1 | 8/2003 | Roskind |
| 2003/0221102 | A1 | 11/2003 | Jakobsson |
| 2003/0229788 | A1 | 12/2003 | Jakobsson |
| 2007/0297614 | A1* | 12/2007 | Rubin ...................... H04L 9/06 380/285 |
| 2008/0165972 | A1* | 7/2008 | Worthington ........... H04L 63/06 380/278 |
| 2011/0099616 | A1 | 4/2011 | Mazur et al. |
| 2011/0126024 | A1 | 5/2011 | Beatson |
| 2012/0131656 | A1 | 5/2012 | Slaton et al. |
| 2013/0080787 | A1 | 3/2013 | Lee et al. |
| 2014/0189808 | A1 | 7/2014 | Mahaffey |
| 2014/0281571 | A1 | 9/2014 | Federspiel |
| 2017/0019261 | A1 | 1/2017 | Mandal |

OTHER PUBLICATIONS

MacKenzie, Philip, Thomas Shrimpton and Markus Jakobsson. "Threshold password-authenticated key exchange." Annual International Cryptology Conference. Spinger Berlin Heidelberg, 2002.

Jablon, David P. "Password authentication using multiple servers." Cryptographers' Track at the RSA Conference. Springer Berlin Heidelberg. 2001.

Desmedt, Y. et al. "Threshold Cryptosystems" Advances in Cryptology—CRYPTO '89, 9th Annual International Cryptology Congerence, Aug. 1989. (pp. 307-315).

EMC Corporation, "RSA Distributed Credential Protection" White Paper, Oct. 2012. (pp. 1-6). Available at : http://emc.com/collateral/software/white-papers/h11013-rsa-dcp-0812-wp.pdf.

Herzberg, A. et al. "Proactive Secret Sharing or How to Cope With Perpetual Leakage" Advances in Cryptology—CRYPTO'95, 15th Annual International Cryptology Conference, Aug. 1995. (pp. 339-352).

IBM Appendix P.

* cited by examiner

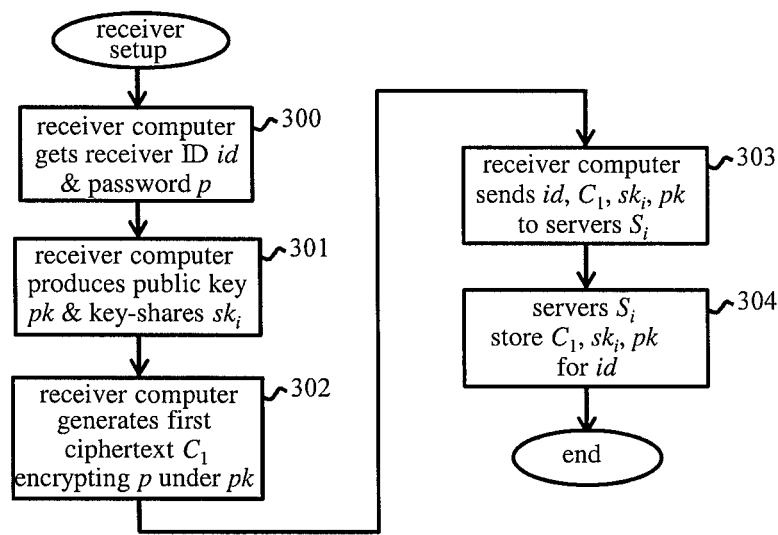
Figure 3
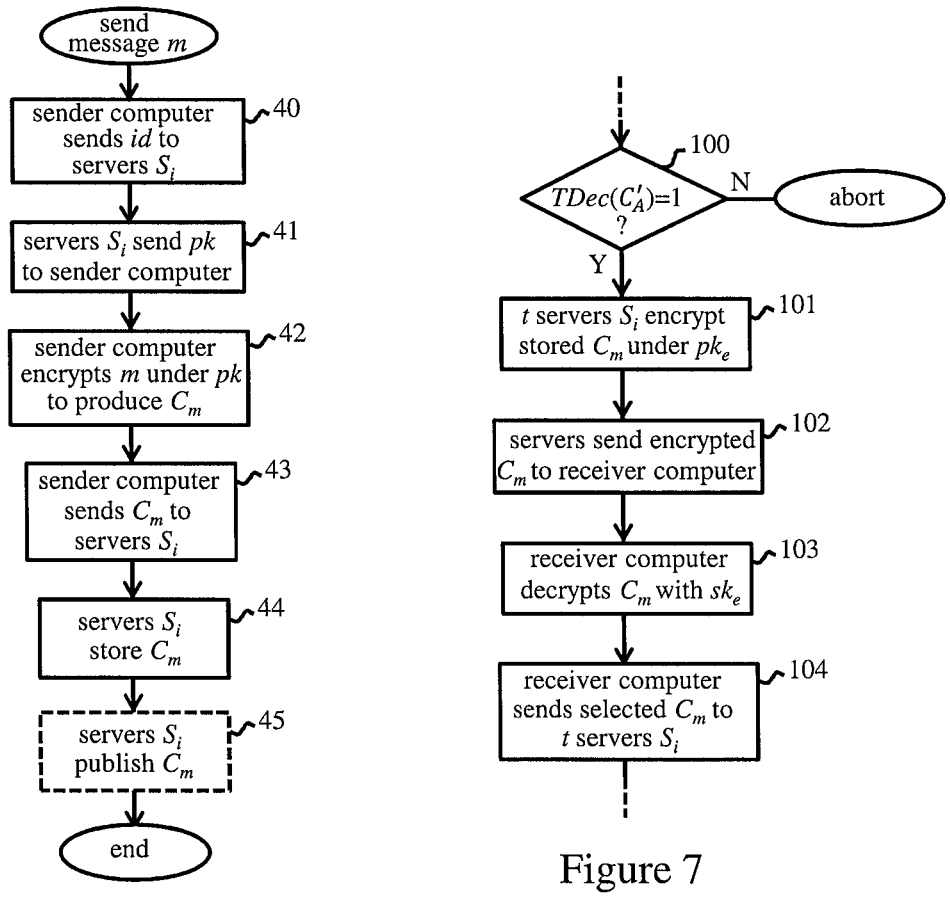
Figure 4
Figure 7

COMMUNICATION OF MESSAGES OVER NETWORKS

BACKGROUND

The present invention relates generally to communication of messages over networks, and more particularly to communication of messages between sender and receiver computers in dependence on authentication of receiver passwords by a server system.

Secure communication of message data between sender and receiver computers via potentially insecure networks can be achieved using a standard PKI (public key infrastructure). PKI-based messaging requires the receiver to store a (high-entropy) secret key. Senders need to know the corresponding public key for that receiver. This public key is used for message encryption whereby only the correct receiver, with the corresponding secret key, can decrypt the message. Public keys are authenticated via certificates issued by a certification authority. These certificates are expensive for users and require appropriate management, e.g. to accommodate revocation.

In the absence of a PKI, secure communication of messages between sender and receiver computers over insecure networks is problematical. The task becomes even more difficult if neither the receiver nor the sender have any cryptographic key material, such as PGP (Pretty Good Privacy), of their own. The standard procedure for message communication is to use an additional server, e.g., a file-host or e-mail server, which receives and stores the message data from a sender. The sender then sends a link to the receiver which uses the link to download the message from the server. If the message is not encrypted, the server can see the message data. Clearly this is not acceptable if the data is sensitive. Simply encrypting the message (e.g. an e-mail) with a strong cryptographic key is also problematical, since then the key has to be sent to the receiver, i.e., the problem has only been shifted to secure communication of the key. One can of course use a password to encrypt the message, but passwords typically have low-entropy and are vulnerable to brute-force attacks. One must therefore assume that a corrupt server learns both the password and all message data sent using the password. Current schemes which do provide some security when passwords are used all have one very important weakness: the password has to be exchanged in advance. This requires that the sender and receiver have established a secure (i.e., a private) channel beforehand, which may not always be feasible, e.g., for e-mails. Such schemes also assume that the sender chooses the password and transmits a message only once with this password. This is a considerable inconvenience and is unrealistic for many applications, e.g. e-mails, where senders may wish to send more than one message to a receiver.

SUMMARY

According to at least one embodiment of the present invention there is provided a system comprising $n \geq 2$ servers $S_i$, $1 \leq i \leq n$, for communicating messages between sender and receiver computers, connectable to the system via a network, in dependence on authentication of receiver passwords, associated with respective receiver IDs, by the system. Each server $S_i$ is adapted to store, for each receiver ID, a first ciphertext produced by encrypting the receiver password associated with that ID under a respective public key via a homomorphic threshold encryption scheme having a threshold $t \leq n$, and a key-share $sk_i$ of a secret key corresponding to that public key. Each server $S_i$ is adapted, in response to receipt from a sender computer of an encrypted message produced by encrypting a message for a receiver ID under the public key for that ID via the encryption scheme, to store the encrypted message. Each server $S_i$ is also adapted, in response to receipt from a receiver computer of a receiver ID, to send the first ciphertext for that ID to the receiver computer and, following receipt from the receiver computer of an authentication value which comprises a predetermined function of that first ciphertext and a second ciphertext produced by encrypting a password attempt under the public key for that ID via the encryption scheme such that the authentication value decrypts to a predetermined value if the password attempt equals the receiver password for that ID, to produce a first decryption share dependent on the authentication value using the key-share $sk_i$ for that ID. Each server $S_i$ is further adapted, in response to receipt of the first decryption share produced by each of (t−1) other servers $S_j$ for the authentication value received for the ID, to determine from the t first decryption shares whether the authentication value decrypts to said predetermined value and, if so, to produce a second decryption share of a selected encrypted message using the key-share $sk_i$ for that ID, and to send the second decryption share to the receiver computer.

Respective further embodiments of the invention provide methods performed by a receiver computer and a server $S_i$ of such systems.

Embodiments of the invention will be described in more detail below, by way of illustrative and non-limiting example, with reference to the accompanying drawings.

BRIEF DESCRIPTION OF THE SEVERAL VIEWS OF THE DRAWINGS

FIG. 3 indicates steps performed in the FIG. 1 system in a setup operation for a receiver ID;

FIG. 4 indicates steps performed to send a message in the system;

FIG. 7 shows a modification to the FIG. 6 operation.

DETAILED DESCRIPTION

Figure 1:
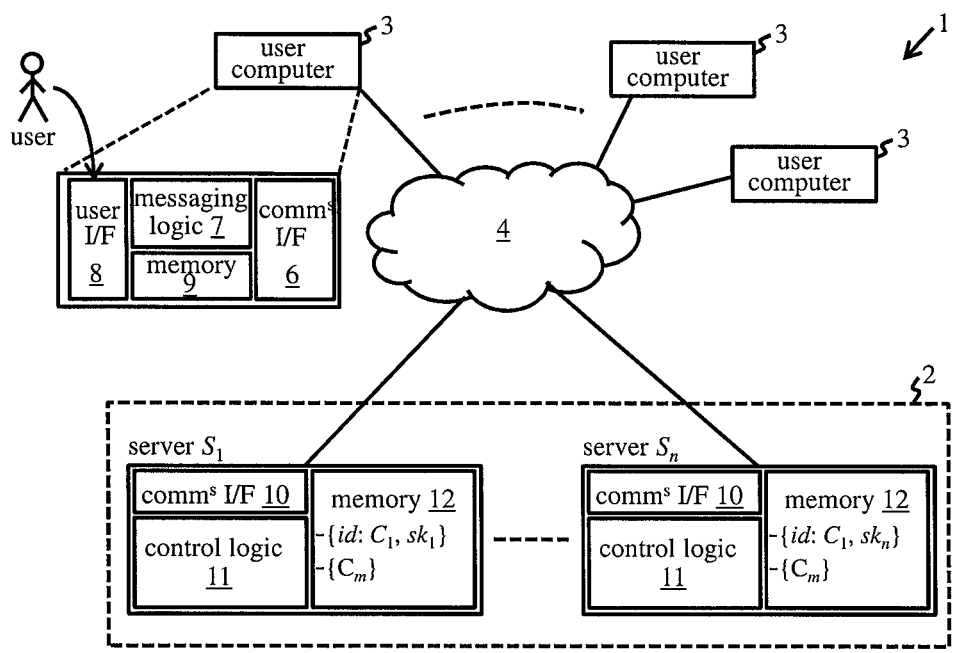
FIG. 1 is a schematic representation of a data processing system including a server system embodying the invention.

FIG. 1 is a schematic block diagram of a data processing system 1 incorporating a server system 2 in accordance with an example embodiment. The server system 2 comprises $n \geq 2$ servers denoted by $S_i$, where $1 \leq i \leq n$. The servers $S_i$ to $S_n$ of system 2 are operable to communicate with a plurality of user computers 3 which are connectable to server system 2 via a network 4. The server system 2 is operable to communicate messages between sender and receiver computers among the user computers 3 in dependence on authentication of receiver passwords, which are associated with respective receiver IDs, by system 2.

A high-level abstraction of functional components of the servers $S_i$ and user computers 3 is shown in FIG. 1. Each user computer 3 is indicated simply here as comprising a communications interface (I/F) 6 for communicating with server system 2 over network 4, messaging logic 7 providing functionality for use in the messaging scheme to be described, a user interface 8 for data input/output interactions with a user, and memory 9 for storing data used by logic 7 in operation of the messaging scheme. A given user computer 3 may operate as a sender computer, a receiver computer, or both a sender and a receiver computer, whereby messaging logic 7 may include functionality for sending and/or receiving messages as appropriate. Each server $S_i$ is indicated as comprising a communications interface (I/F) 10 for communications via network 4, control logic 11, and memory 12. The control logic 11 provides functionality for implementing steps of the authentication and message communication operations detailed below. Memory 12 stores various data used by the control logic 11 in operation. This includes a receiver data set $\{id: C_1, sk_i\}$ containing data items associated with the receiver ID id of each message receiver registered with server system 2. The data items stored for each receiver ID comprise a first ciphertext $C_1$ and a secret key-share $sk_i$, and typically include various other items, such public keys, used in operation of the protocols to be described. Memory 12 also stores a message data set $\{C_m\}$ containing encrypted messages $C_m$ which are received from sender computers 3 in operation.

The number n of servers $S_i$ can be selected as desired for a given system. In general, higher values of n offer greater system security. The servers $S_i$ may be located at one or more different locations, and may be controlled by the same entity or by one or more different entities. The number, distribution and control of the servers can thus be selected according to security requirements of a given system.

The network 4 may in general comprise one or more component networks and/or internetworks, including the Internet. A user computer 3 may be implemented by a general-purpose user computer such as a desktop computer, laptop computer, tablet, notebook or palmtop, etc., but may also comprise a mobile phone, PDA (personal digital assistant), personal music player, or any other computing device. A server $S_i$ may be implemented by a general- or special-purpose computer, comprising one or more (real or virtual) machines, providing functionality for implementing the operations described herein. In general, each of the functional blocks of devices shown in FIG. 1 may be implemented by one or more functional components which may be provided by one or more computers. The logic 7 and 11 of these devices may be implemented by hardware or software or a combination thereof. The logic may be described in the general context of computer system-executable instructions, such as program modules, executed by a computing apparatus. Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, data and program modules may be located in both local and remote computer system storage media including memory storage devices.

Figure 2:
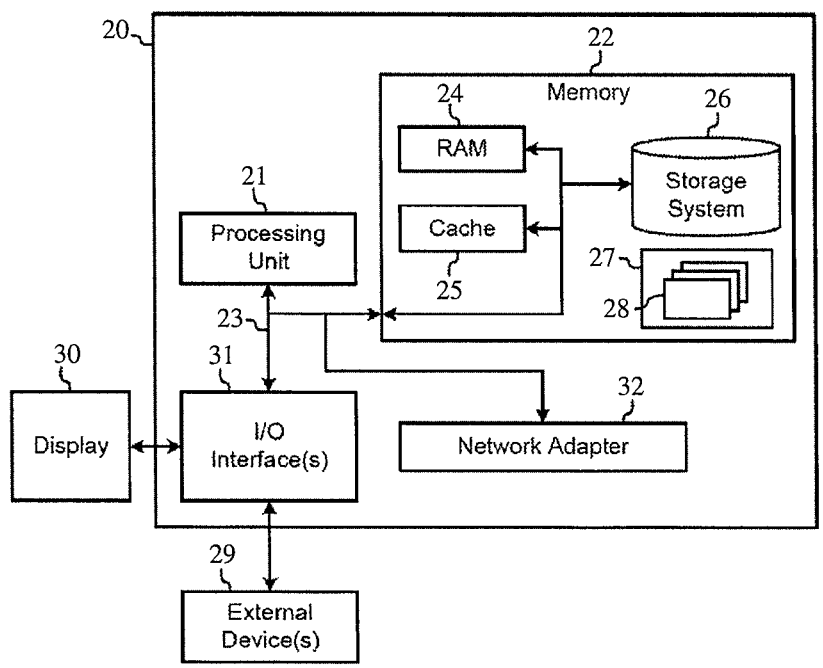
FIG. 2 is a generalized schematic of a computer in the system of FIG. 1.

FIG. 2 is a block diagram of exemplary computing apparatus for implementing a computer of system 1. The computing apparatus is shown in the form of a general-purpose computer 20. The components of computer 20 may include processing apparatus such as one or more processors represented by processing unit 21, a system memory 22, and a bus 23 that couples various system components including system memory 22 to processing unit 21.

Bus 23 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 20 typically includes a variety of computer readable media. Such media may be any available media that is accessible by computer 20 including volatile and non-volatile media, and removable and non-removable media. For example, system memory 22 can include computer readable media in the form of volatile memory, such as random access memory (RAM) 24 and/or cache memory 25. Computer 20 may further include other removable/non-removable, volatile/non-volatile computer system storage media. By way of example only, storage system 26 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 23 by one or more data media interfaces.

Memory 22 may include at least one program product having one or more program modules that are configured to carry out functions according to example embodiments. By way of example, program/utility 27, having a set (at least one) of program modules 28, may be stored in memory 22, as well as an operating system, one or more application programs, other program modules, and program data. Each of the operating system, one or more application programs, other program modules, and program data, or some combination thereof, may include an implementation of a networking environment. Program modules 28 generally carry out the functions and/or methodologies in accordance with example embodiments as described herein.

Computer 20 may also communicate with: one or more external devices 29 such as a keyboard, a pointing device, a display 30, etc.; one or more devices that enable a user to interact with computer 20; and/or any devices (e.g., network card, modem, etc.) that enable computer 20 to communicate with one or more other computing devices. Such communication can occur via Input/Output (I/O) interfaces 31. Also, computer 20 can communicate with one or more networks such as a local area network (LAN), a general wide area network (WAN), and/or a public network (e.g., the Internet) via network adapter 32. As depicted, network adapter 32 communicates with the other components of computer 20 via bus 23. It should be understood that although not shown, other hardware and/or software components could be used in conjunction with computer 20. Examples include, but are not limited to: microcode, device drivers, redundant processing units, external disk drive arrays, RAID systems, tape drives, and data archival storage systems, etc.

Embodiments of the messaging scheme in system 1 are described below with reference to FIGS. 3 to 7. In the protocols described, communications to/from servers $S_i$ may be encrypted and/or signed in the usual manner using encryption/signature schemes of a server-based PKI. Such procedures are standard for server systems nowadays, and details are omitted in the following for simplicity. A detailed implementation indicating all signature/encryption steps is given later.

FIG. 3 indicates basic steps of a setup operation for registering a receiver ID with server system 2. This protocol is executed when a new user wishes to register with server system 2 to receive messages via the system. The setup operation is initiated when the user (the "receiver") connects to server system 2 from a user computer 3 (in this context a "receiver computer") over network 4 to request registration. On initiation of the setup procedure in FIG. 3, a new receiver ID id and an associated receiver password p (which will be used for subsequent authentication of the receiver) are input to receiver computer 3 in step 300. In a typical scenario, the user password p is selected personally by the receiver and input via user I/F 8 of receiver computer 3. The receiver ID may be input by the receiver in some embodiments, or (all or part of) the receiver ID may be allocated by server system 2 and supplied to receiver computer 3 via communications interface 8. In particular, the receiver ID should be unique in system 2. Also, for convenience in this preferred embodiment, the receiver ID contains the ID of each server $S_i$ in system 2. Step 300 may therefore involve interaction with server system 2 for approval/allocation of the new receiver ID id. In step 301, the messaging logic 7 of computer 3 generates a key-set for an encryption scheme TENC. This key set comprises a public key pk and n key-shares $sk_i$ of a secret key corresponding to the public key pk. The encryption scheme TENC is a homomorphic threshold encryption scheme having a selected threshold t, where t≤n. As is well known in the art, threshold encryption schemes are designed so that decryption of a ciphertext C=$TEnc_{pk}$(m) (i.e. C is the result of encrypting a message m under the public key pk via an encryption algorithm TEnc of the scheme) requires use of the threshold number t of the key-shares (also known as "partial secret keys") $sk_1$ to $sk_n$. A homomorphic encryption scheme has a homomorphic property, whereby there exists an operation ⊙ on ciphertexts C such that, if $C_1 \in TEnc_{pk}(m_1)$ and $C_2 \in TEnc_{pk}(m_2)$, then $C_1 \odot C_2 \in TEnc_{pk}(m_1 \cdot m_2)$ for a group operation "·". (In the following, we will use exponents to denote the repeated application of ⊙, e.g. $C^2$ to denote C⊙C).

In step 302 of FIG. 3, the messaging logic 7 of receiver computer 3 produces a first ciphertext $C_1$ by encrypting the user password p under the public key pk via the encryption scheme TENC, i.e. $C_1=TEnc_{pk}$(p). In general, the first ciphertext $C_1$ may encrypt the user password p per se or some function thereof as discussed below. In step 303, the messaging logic 7 sends the new receiver ID id, the first ciphertext $C_1$ and the public key pk to server system 2, in this embodiment by communicating individually with each server $S_i$. The messaging logic 7 also sends the n key-shares $sk_i$ to respective servers $S_i$. (Security of the key-shares $sk_i$ is preserved here by encryption under respective public keys, certified via a PKI, of the servers $S_i$ as described above). In step 304, each server $S_i$ stores the first ciphertext $C_1$, its key-share $sk_i$, and the public key pk for the new receiver ID id in its receiver data set. The registration process for id is then complete.

FIG. 4 indicates basic steps of a procedure for sending a message m in system 1. To implement this protocol, a user (the "sender") needs only the receiver ID id of the intended recipient of the message. The sender connects to server system 2 from a user computer (in this context a "sender computer") 3 over network 4 and, in step 40, messaging logic 7 sends the appropriate receiver ID id. In step 41, server system 2 responds by sending the public key pk stored for id to the sender computer 3. Since all servers $S_i$ are identified in the receiver ID in this preferred embodiment, steps 40 and 41 can be performed for all servers individually, permitting verification by messaging logic 7 that the same public key pk is returned by all servers $S_i$. In step 42, the messaging logic 7 encrypts the message m under the received public key pk via the encryption scheme TENC, producing an encrypted message $C_m=TEnc_{pk}$(m). In step 43, the messaging logic then sends the encrypted message $C_m$ to server system 2, again by individual communications with each server $S_i$ in this embodiment. In step 44, each server $S_i$ stores the encrypted message $C_m$ in its message data-set. The dashed box of step 45 indicates an additional step performed in preferred embodiments below. In this step, the servers $S_i$ publish the encrypted message $C_m$ received in step 44. Publication can be effected here by posting to a public bulletin board or via any convenient mechanism which makes encrypted messages accessible to receiver computers. (Since messages m are encrypted in the ciphertexts $C_m$, there is no loss of security in this step). The published $C_m$ may also be authenticated by server signatures under the server PKI discussed above. The sending protocol is then complete.

Figure 5:
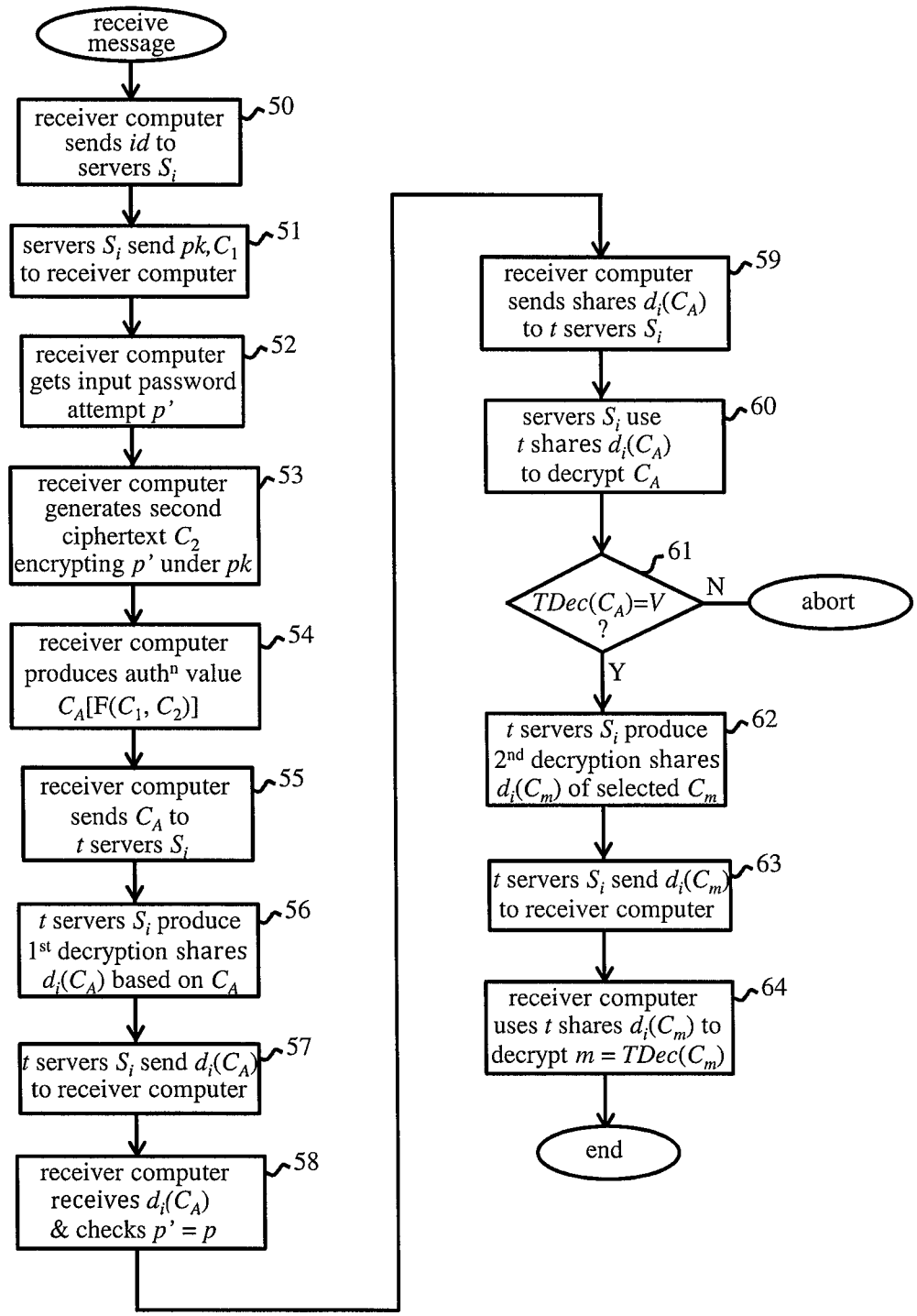
FIG. 5 indicates steps performed to receive a message in a first embodiment of the system.

FIG. 5 indicates basic steps of the procedure for receiving a message in a first embodiment of the messaging system. To implement this protocol, a receiver needs only his receiver ID id and the associated receiver password p. The receiver connects to server system 2 from a receiver computer 3 and, in step 50, messaging logic 7 sends the receiver ID id. (The receiver ID may be input by the receiver here or pre-stored in receiver computer 3). In step 51, server system 2 responds by sending the first ciphertext $C_1$ and public key pk stored for that receiver ID to the receiver computer 3. Again, steps 50 and 51 can be performed with individual servers $S_i$ identified in the receiver id, permitting verification of the responses by messaging logic 7. In this embodiment, these steps are performed with (at least) the threshold number t of servers $S_i$ which may be chosen from the n servers in system 2, e.g. as the first t servers to respond. In step 52, the receiver inputs a password attempt p' (i.e. an attempt at the user password p) on prompting by receiver computer 3. In step 53, messaging logic 7 produces a second ciphertext $C_2$ by encrypting the password attempt p' under the public key pk via the encryption scheme TENC. The second ciphertext $C_2$ may encrypt the password attempt p' per se or some function thereof as discussed below. In step 54, messaging logic 7 then produces an authentication value $C_A$. The authentication value $C_A$ comprises a predetermined function, denoted here by F, of the first ciphertext $C_1$ and the second ciphertext $C_2$. The predetermined function F combines the ciphertexts $C_1$ and $C_2$ via the homomorphic operator ⊙ discussed above as $F(C_1, C_2)=C_1 \odot C_2$. The authentication value $C_A[F(C_1, C_2)]$ is such that, by virtue of the homomorphic property and construction of the first and second ciphertexts from p and p' respectively, the authentication value decrypts to a predetermined value V if p'=p, i.e. if the password attempt is correct for the associated receiver ID id.

In step 55, the messaging logic 7 sends the authentication value $C_A$ to the t servers $S_i$ mentioned above. In step 56, following receipt of $C_A$ for the receiver ID id, each of the t servers $S_i$ produces a first decryption share dependent on the authentication value $C_A$ using its key-share $sk_i$ for id. This decryption share $d_i(C_A)$ can be produced by decrypting the authentication value $C_A$ (or, in preferred embodiments below, a function of $C_A$) via a partial decryption algorithm PDec of the encryption scheme TENC. In step 57, each of the t servers $S_i$ sends its first decryption share $d_i(C_A)$ to receiver computer 3. In step 58, messaging logic 7 uses the t first decryption shares $d_i(C_A)$ to check that the password attempt p' received in step 53 is correct (i.e. that p' equals the receiver password p for id) before proceeding further. In particular, the messaging logic can use the t first decryption shares $d_i(C_A)$ to determine whether the authentication value $C_A$ decrypts to the predetermined value V. This determination can be made by using the t shares $d_i(C_A)$ to decrypt the authentication value $C_A$ (or, in preferred embodiments below, a function of $C_A$) via a decryption algorithm TDec of the encryption scheme TENC. Assuming $C_A$ decrypts to V, then p'=p and operation can proceed to step 59. Here, messaging logic 7 sends the t first decryption shares $d_i(C_A)$ to each of the t servers $S_i$. On receipt, in step 60, each of the t servers $S_i$ then repeats the password check. That is, each server $S_i$ uses the t first decryption shares $d_i(C_A)$ to determine whether the authentication value $C_A$ decrypts to the predetermined value V. If so, as indicated by a "Yes" (Y) at decision block 61, the receiver password is authenticated as the correct password p for id, and operation continues to step 62. Here, each of the t servers $S_i$ produces a second decryption share of a selected encrypted message $C_m$ using its key-share $sk_i$ for id. (This encrypted message $C_m$ can be selected in various ways discussed further below). Hence, each server $S_i$ uses $sk_i$ to decrypt the selected $C_m$ using the partial decryption algorithm PDec of the encryption scheme TENC. Each of the t servers $S_i$ sends the resulting second decryption share $d_i(C_m)=\text{PDec}_{sk_i}(C_m)$ to the receiver computer in step 63. On receipt, in step 64, messaging logic 7 uses the t second decryption shares $d_i(C_m)$ to decrypt $C_m$ via the decryption algorithm TDec of the encryption scheme TENC. Provided $C_m$ was encrypted under the correct pk for that receiver's ID id, the receiver will thus obtain the original message m. Otherwise decryption results in garbage. Returning to step 61, if authentication fails at any server $S_i$ ("No" (N) at decision block 61), then that server aborts the protocol and subsequent decryption of $C_m$ cannot proceed.

The above operation provides an efficient messaging scheme which is both secure and convenient for users. Neither senders nor receivers need to store any pre-shared secrets, keys or other cryptographic material. A receiver has a master password p of his own choice, but the sender does not need to know, and cannot learn, this password. A sender needs only the receiver ID id of the intended recipient of the message. A receiver needs only his receiver ID id and password p to obtain his messages. Messages can be accessed only if the receiver password is successfully authenticated by server system 2. However, authentication and decryption require cooperation of the threshold number t≤n servers $S_i$. Thus, servers cannot perform offline-attacks on the password or the password attempts, and can also apply throttling mechanisms (discussed further below) to frustrate a dishonest receiver. Provided that less than t servers $S_i$ are corrupt at the same time, they cannot learn the receiver's password p, the password attempts p', or the data m transmitted. The sender and receiver do not need to be online at the same time: the receiver can be offline at sending, and the sender can be offline at receiving. More than one sender can send messages to any receiver, and multiple messages m can be sent between any given sender and receiver.

While it is convenient for the servers to store the public keys pk for respective receiver IDs, and to supply these to sender/receiver computers as above, embodiments may be envisaged in which the public keys for receiver IDs are otherwise published and accessible to parties as required. Also, while the foregoing describes basic steps of the various protocols, protocols may include additional steps, communications may include additional data items, individual steps may include additional actions, and performance of certain steps may depend on results of additional actions. For example, where communications are encrypted and/or signed as discussed earlier, steps may be dependent on authentication/validation of communications, e.g. authentication of signatures and/or verification of proofs associated with encrypted values.

Figure 6:
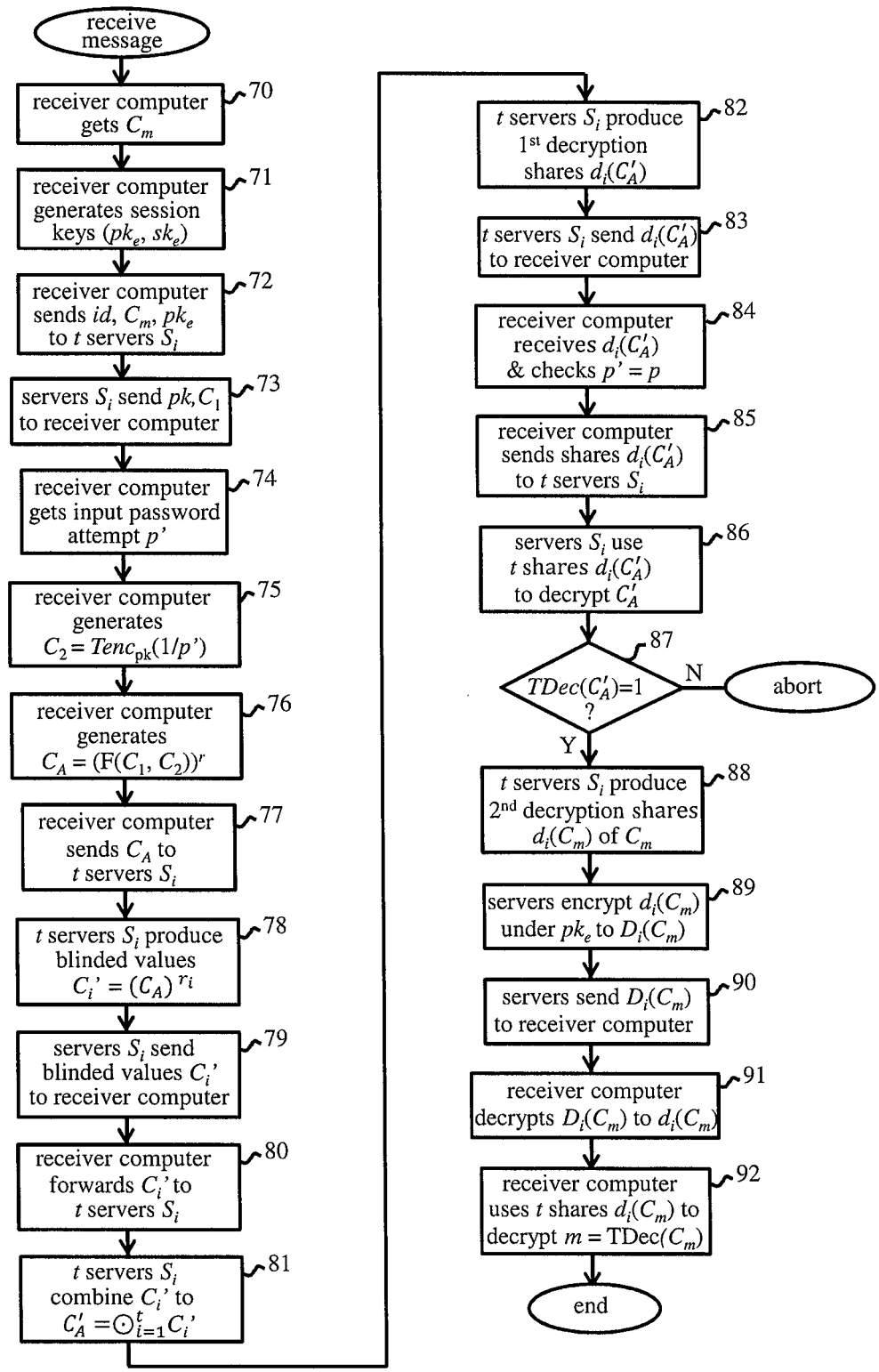
FIG. 6 indicates steps performed to receive a message in a second embodiment of the system.

The encrypted message $C_m$ selected for decryption in step 62 of FIG. 5 may be selected by the receiver following publication by server system 2 (step 45 of FIG. 4). Steps of a preferred embodiment using this feature in the message receipt protocol are shown in FIG. 6. In step 70 of this protocol, the receiver computer 3 retrieves the encrypted message $C_m$ to be decrypted from the bulletin board or other publication site used by server system 2. In step 71, the messaging logic of receiver computer 3 generates a key-pair $(pk_e, sk_e)$ of a standard encryption scheme, where $pk_e$ is a public key and $sk_e$ the secret key to be used for the current message-retrieval session. In step 72, the receiver computer sends the receiver ID id, the selected encrypted message $C_m$, and the session public key $pk_e$ to t servers $S_i$. In step 73, the servers $S_i$ respond as before by sending the first ciphertext $C_1$ and public key pk stored for id to receiver computer 3. In step 74, the receiver inputs a password attempt p' to receiver computer 3. In step 75, the messaging logic produces a second ciphertext $C_2$ by encrypting the function (1/p') under the public key pk using the encryption scheme TENC, i.e. $C_2=\text{TEnc}_{pk}(1/p')$. In step 76, messaging logic 7 chooses a random value r and computes the authentication value by blinding the function $F(C_1, C_2)$ with the random exponent r, i.e., $C_A=(F(C_1,C_2))^r=(C_1 \odot C_2)^r$ where the group operation "·" defined above represents multiplication. Due the homomorphic property, it follows that the authentication value $C_A$ encrypts a quotient of p and p' via the homomorphic encryption algorithm, i.e. $C_A=(\text{TEnc}_{pk}(p/p'))^r=\text{TEnc}_{pk}(p/p')^r$ whereby $C_A$ decrypts to a predetermined value of V=1 if p'=p. In step 77, the messaging logic then sends the authentication value $C_A$ to the t servers $S_i$.

Following receipt of $C_A$ for id by the t servers $S_i$, in step 78 each server $S_i$ selects a random exponent $r_i$ and produces a blinded value $C_i'$ by blinding the authentication value with $r_i$, i.e. $C_i'=C_A^{r_i}$. In step 79, the t servers $S_i$ send their blinded values $C_i'$ to receiver computer 3. In step 80, the receiver computer forwards the t blinded values $C_i'$ to each of the t servers $S_i$. In step 81, each of the t servers $S_i$ combines the t blinded values $C_i'$ via the homomorphic operator $\odot$ to produce a randomized authentication value as $C_A'=\odot_{i=1}^{t}=C_i'$. In step 82, each server $S_i$ then produces a first decryption share of $C_A'$ as $d_i(C_A')=\text{PDec}_{sk_i}(C_A')$. In step 83, each server sends its first decryption share $d_i(C_A')$ to receiver computer 3. In step 84, messaging logic 7 uses the t decryption shares $d_i(C_A')$ to decrypt $C_A'$ via $\text{TDec}(C_A')$, checking that the result is p/p'=1 and hence p'=p. Assuming so, operation proceeds to step 85 where messaging logic 7 sends the t first decryption shares $d_i(C_A')$ to each of the t servers $S_i$. On receipt, in step 86, each server $S_i$ then uses the t shares $d_i(C_A')$ to check that $\text{TDec}(C_A')=1$ and hence p'=p. If so, ("Yes" at decision block 87), the receiver password is authenticated and operation continues to step 88. Here, each of the t servers $S_i$ produces a second decryption share $d_i(C_m)$ of the encrypted message $C_m$ supplied in step 72. Each server $S_i$ thus uses its key-share $sk_i$ to produce $d_i(C_m)=\text{PDec}_{sk_i}(C_m)$. In step 89, each server $S_i$ then encrypts its decryption share $d_i(C_m)$ under the session public key $pk_e$ supplied by the receiver computer in step 72. The encrypted decryption share $D_i(C_m)=\text{Enc}_{pk_e}(d_i(C_m))$ of each server, where Enc is the encryption algorithm of the session encryption scheme, is then sent to the receiver computer in step 90. In step 91, messaging logic 7 decrypts the encrypted shares $D_i(C_m)$, using its session secret key $sk_e$, via a decryption algorithm Dec of the session encryption scheme to recover the second decryption shares $d_i(C_m)=\text{Dec}_{sk_e}(D_i(C_m))$. In step 92, messaging logic 7 uses the t shares $d_i(C_m)$ to decrypt $C_m$ as before. The receiver thus obtains the original message m if $C_m$ was encrypted under the pk for his id. Otherwise $C_m$ decrypts to garbage.

In some systems, the above protocol may be performed by receiver computer 3 for each encrypted message $C_m$ published by server system 2. The receiver will only get messages m sent to his particular receiver ID, because decryption step 92 outputs garbage if the public key pk used for encryption of m by a sender is not the correct pk for that receiver's id. However, other systems may employ an additional mechanism, such as tags for encrypted messages, whereby a receiver can determine from the tag for a published $C_m$ whether that particular $C_m$ contains a message for him. Such tagging mechanisms are well known in cryptography and need not be discussed here, the implementation details being orthogonal to the messaging schemes herein.

As a modification to the FIG. 6 protocol, where multiple $C_m$ are to be tested, these could be supplied successively to the servers $S_i$ by the receiver computer after successful authentication in step 87 above. This avoids repetition of the authentication step for each message. A further modification to the FIG. 6 protocol is indicated in FIG. 7 and may be employed in embodiments where the server system does not publish the encrypted messages $C_m$. FIG. 7 begins at step 100 with the password authentication step (step 87 in FIG. 6), all previous steps being as in FIG. 6 except that the receiver does not supply an encrypted message $C_m$ in step 72. On successful authentication in step 100, in step 101 each of the t servers $S_i$ then encrypts its stored encrypted messages $C_m$ under the session public key $pk_e$ supplied by the receiver computer in step 72. In step 102, each server sends the encrypted $C_m$ to the receiver computer, which uses its session secret key $sk_e$ to decrypt the encrypted $C_m$ in step 103. The receiver computer then selects a particular $C_m$ for decryption and sends this to the t servers $S_i$ in step 104. Subsequent steps correspond to steps 88 to 92 of FIG. 6. With this modification, the server system need not publish the stored $C_m$ which can only be retrieved if the receiver enters the correct password, and are then sent in encrypted form. Also, not all (potentially large) $C_m$ need necessarily be sent in step 102. A header portion $C_h$ of $C_m$ (e.g. encrypting "subject" and "from" fields of a message m under the same threshold encryption key pk) could be sent in some embodiments to allow message selection by the receiver. Such a "sneak preview" may also be used where servers publish the $C_m$, or at least the $C_h$ portion thereof. For example, the header portion $C_h$ could be sent in step 72 instead of the complete message ciphertext $C_m$. The complete message can then be decrypted by repeating steps 88 to 92. To facilitate this, $C_h$ can be generated by the sender and included in context of the $C_m$ sent to server system 2 for checking by the servers.

Use of an authentication value $C_A$ which decrypts to V=1 is exploited to allow blinding of values in steps 76 and 78 of FIG. 6, while still permitting authentication of passwords via the homomorphic property of the encryption scheme TENC. The randomization by the exponents r, $r_i$ prevents corrupt servers from obtaining any information about p or p' in the quotient p/p' even if the password attempt is incorrect. As before, the protocol may include additional steps/values/actions and particular steps may depend on results of additional actions. For instance, as illustrated by the detailed example below, blinded values computed in steps 76 and 78 can be accompanied by cryptographic proofs of correctness to prevent incorrect computation by malicious parties Server system 2 can apply generally known throttling mechanisms to restrict message retrieval attempts in the above embodiments. For example, if a dishonest receiver tries to use an incorrect password p' too many times, or too many times within a given time period, servers can limit the permitted number of additional tries, or ask for additional authentication. Various such throttling mechanisms are known in the art and may be applied as appropriate in the system. If honest servers block after too many retrieval attempts (say, e.g., three failed attempts in a row), any attacker is thus limited to online-guessing on the receiver's account, offering security similar to PIN-codes or online-banking websites. After triggering of a throttling mechanism, servers may be "unblocked" following suitable further authentication, e.g. authentication via personal appearance or other personal information.

An exemplary implementation of the FIG. 6 scheme is described in detail below. Some preliminaries are described first.

Notation.

We use $\lambda \in \mathbb{N}$ as our security parameter. s←A(x; r) denotes that s is assigned the output of algorithm A on input x and explicit randomness r. If r is dropped, we assume that r is drawn internally. $\{0, 1\}^*$ denotes the set of all strings of finite length.

Building Blocks.

We use the following standard primitives: an existentially unforgeable signature scheme against chosen message attacks. (sUNF-CMA); a CCA2-secure encryption scheme with labels; and a semantically secure threshold encryption scheme which allows for a homomorphic property and efficient zero-knowledge proofs described later.

sUNF-CMA Signature Schemes.

A standard digital signature scheme DSIG consists of three algorithms. In particular, DSIG:=(SKeyGen; Sign; Verify) as follows.

SKeyGen.

The algorithm SKeyGen outputs the public and private key of the signer, where $\lambda$ is the security parameter:

$$(pk, sk) \leftarrow \text{SKeyGen}(1^\lambda)$$

Sign.

The algorithm Sign gets as input the secret key sk, and the message $m \in \mathcal{M}$ to sign, where $\mathcal{M} = \{0, 1\}^*$. It outputs a signature σ:

$$\sigma \leftarrow \text{Sign}(sk, m)$$

Verify.

The algorithm Verify outputs a decision bit $d \in \{0, 1\}$, indicating the validity of the signature σ, with respect to pk and m. d=1 indicates a valid signature, while d=0 indicates invalidity. In particular:

$$d \leftarrow \text{Verify}(pk, m, \sigma)$$

The usual correctness requirements must also hold, i.e., for all security parameters$\in \mathbb{N}$, for all (pk, sk)←SKeyGen $(1^\lambda)$, and all $m \in \{0, 1\}^*$, Verify(pk, m, Sign(sk, m))=1. We require that the standard security guarantees hold, i.e., security against adaptive chosen message attacks.

CCA2-Secure Encryption Scheme with Labels.

A CCA2-secure encryption scheme ENC2 consists of three algorithms. In particular, ENC2:=(EKeyGen, EEnc, EDec) as follows.

EKeyGen.

The algorithm EKeyGen outputs the public and private key of the encryption scheme, where $\lambda$ is the security parameter:

$$(pk, sk) \leftarrow EKeyGen(1^\lambda)$$

EEnc.

The algorithm EEnc gets as input the public key pk, the message $m \in \mathcal{M}$ to encrypt, where $\mathcal{M}$ is the message space, and a label $l \in \{0, 1\}^*$. It outputs a ciphertext C:

$$C \leftarrow EEnc(pk, m, l)$$

EDec.

The algorithm EDec outputs a plaintext $m \in \mathcal{M}$, or a special symbol $\nRightarrow \notin \mathcal{M}$ if decryption failed, based on the secret key sk, the ciphertext C, and a label l. In particular:

$$m \leftarrow EDec(sk, C, l)$$

The usual correctness requirements must also hold, i.e., for all security parameters $\lambda \in \mathbb{N}$, for all $(pk, sk) \leftarrow EKeyGen(1^\lambda)$, and all $m \in \{0, 1\}^*$, EDec (sk, EEnc(pk, m, l), l)=m. Additionally, we require that ENC2 is CCA2-secure.

Semantically Secure Homomorphic Threshold Encryption.

A semantically-secure threshold homomorphic encryption scheme TENC consists of five algorithms. In particular, TENC:=(TKeyGen; TEnc; PDec; VfPDec; PDec) as follows.

TKeyGen.

The algorithm TKeyGen outputs the public and private keys for each participant and the public key of the scheme, where $\lambda$ is the security parameter, $n \geq 2$, $n \in \mathbb{N}$ is the number of participants, and $t \leq n \in \mathbb{N}$ is the threshold:

$$(pk_t, \{(pk_i, sk_i)\}_{0 < i \leq n}) \leftarrow TKeyGen(1^\lambda, t, n)$$

where $pk_i$, $sk_i$ are partial key pairs and the partial secret key $sk_i$ is a key-share of the secret key corresponding to the public $pk_t$ of the encryption scheme.

TEnc.

The algorithm TEnc gets as input the public key $pk_t$, the message $m \in \mathcal{M}$ to encrypt, where $\mathcal{M}$ is the message space. It outputs a ciphertext C:

$$C \leftarrow TEnc(pk_t, m)$$

PDec.

The algorithm PDec outputs a decryption share $d_i$, or a special symbol $\perp \notin \mathcal{M}$ if decryption failed, and a proof $\pi_i$ that decryption was performed correctly with respect to the key-share $sk_i$ and the ciphertext C. In particular:

$$(d_i, \pi_i) \leftarrow PDec(sk_i, C)$$

TDec.

The algorithm TDec outputs the message m, or a special symbol $\perp \notin \mathcal{M}$ if decryption failed for the ciphertext C with respect to (at least) t partial decryption shares $d_i$. In particular:

$$m \leftarrow TDec(C, \{d_i\}_{0 < i \leq t})$$

VfPDec.

The algorithm VfPDec outputs a decision bit $d \in \{0, 1\}$ on input ($pk_i$, $d_i$, C, $\pi_i$) indicating whether decryption was performed correctly with respect to the key-share $sk_i$ (which corresponds to $pk_i$) and the ciphertext C. In particular:

$$d \leftarrow VfPDec(pk_i, d_i, C, \pi_i)$$

We require that TENC is sound and semantically secure. Sound in this context means that a ciphertext C serves as a perfectly binding commitment, while semantically secure means that even if the adversary owns (t−1) shares of the private key, it cannot derive any information about the plaintext.

We also require that TENC has a specific homomorphic property. Namely, we require a function $\odot: C \times C \rightarrow C$ such that for all messages $(m_1, m_2) \in \mathcal{M}^2$, $TEnc(pk_t, m_1) \odot TEnc(pk_t, m_2)$ deciphers to $m_1 m_2$ if decrypted with PDec and TDec. As a shorthand notation, we use $C^r$ for $$\underbrace{C \odot C \ldots \odot C}_{r \text{ times}}.$$

Note, this can be calculated efficiently using repeat squaring. An exemplary instantiation of such a scheme, which also allows for efficient zero-knowledge proofs of knowledge, is described in "Memento: How to reconstruct your secrets from a single password in a hostile environment", Camenisch et al., in CRYPTO 2014, pages 256-275, 2014.

Non-Interactive Zero-Knowledge Proof-System.

We use the notation $\pi \leftarrow NIZK\{(x): y=g^x\}(context)$ to denote a non-interactive zero-knowledge proof of knowledge demonstrating that the prover knows an x such that $y=g^x$, where the x is the hidden value and $y=g^x$ the statement to be proven, while all other values, i.e., y and g, are publicly known. Moreover, the proof is bound to context, which is also public. This means that the context used to check the proof has to be the same context it was created with. Clearly, the system has to be zero-knowledge, i.e., after seeing a proof it, an adversary learns nothing more than the given statement.

The various protocols of the messaging scheme are described in the following. Each instance of these protocols can be run with a unique session identifier (omitted here for simplicity) to further rule out replay attacks.

Setup.

The sender does not require any setup. Each of the n servers $S_i$ does upfront:

1. Create a key pair $(pk_i^e, sk_i^e) \leftarrow EKeyGen(1^\lambda)$ for an encryption scheme.
2. Create a key pair $(pk_i^e, sk_i^s) \leftarrow SKeyGen(1^\lambda)$ for a signature scheme.
3. Register the public key pair $(pk_i^e, pk_i^s)$ at a PKI (which is standard nowadays).

To create an account, the receiver does, on input password p and receiver ID id:

1. Choose $n \geq 2$ servers, and a threshold $0 < t \leq n$. We assume that the ordering is implicit, e.g., order by IP-addresses and ports. In a practical implementation, this could be done by the service provider, e.g., by choosing from different datacenters.
2. Receive all $(pk_i^e, pk_i^s))$ for $0 < i \leq n$.
3. Let $(pk_t, \{(pk_i^t, sk_i^t)\}_{0 < i \leq n}) \leftarrow TKeyGen(1^\lambda, t, n)$
4. Encrypt p using $pk_t$, i.e., let $C_1 \leftarrow TEnc(pk_t, p)$.
5. Set context $\leftarrow ((pk_i^t)_{i \in [1 \ldots n]}, (pk_i^e)_{i \in [1 \ldots n]}, (pk_i^s)_{i \in [1 \ldots n]}, pk_t, C_1, id)$. Note id contains the server identifiers.
6. Let $C_i \leftarrow EEnc(pk_i^e, sk_i^t, context)$
7. Send all ($C_i$, context) to each server $S_i$.
8. Each server $S_i$, upon receiving ($C_i$, context), checks whether id has been seen before. If so, the server ignores the request. Otherwise, it decrypts and stores $sk_i^t \leftarrow EDec(sk_i^e,$ $C_i$, context) (note, at most one will decrypt). A server also aborts, if it has seen $pk_t$ before.

9. Each server $S_i$ signs $\sigma_i^1 \leftarrow \text{Sign}(sk_i^s, ((C_i)_{i \in [1 \ldots n]}, \text{context}))$. Each signature is then sent to the receiver.

10. If the receiver has received all signatures, it checks their correctness. If any signature is invalid, it aborts.

11. The receiver sends all signatures $\sigma_i^1$ to all servers $S_i$, which then verify the correctness again. If any signature is not valid, a server aborts. Each server also stores the received signatures $(\sigma_i^1)_{i \in [1 \ldots n]}$.

12. Each server $S_i$ generates $\sigma_i^2 \leftarrow \text{Sign}(sk_i^s, ((\sigma_i^1)_{i \in [1 \ldots n]}, \text{context}))$, and sends $\sigma_i^2$ to the receiver. The receiver then checks the validity of each signature again. If these are valid, the receiver knows that it is successfully registered. Note, we assume that each server verifies the other servers' public keys implicitly.

Sending.

To send a message m to id the sender does:
1. Query each server $S_i$ (stored in id) with id to receive ($C_i$, $C_1$, $\text{context}_i$), and all $\sigma_i^1$. If for any k, j $\text{context}_k \neq \text{context}_j$, ignore. Also ignore if any signature is invalid.
2. Let $C_m \leftarrow \text{TEnc}(pk_t, m)$.
3. Send $C_m$ to each server $S_i$.
4. Each server stores $C_m$.

To give the receiver knowledge of which data is stored, each server simply announces all $C_m$ (authentically). Depending on the network, not all servers may be able to announce the ciphertexts. However, the overall process from sending to receiving needs only the threshold number t of servers in order to be successful.

Receiving.

To receive a particular message m on input $C_m$ (which can be seen as the "index"), and a password attempt p' do:
1. Generate a key pair $(pk_e', sk_e') \leftarrow \text{EKeyGen}(1^\lambda)$.
2. Select t servers from the n servers.
3. Send each server $pk_e'$, id.
4. Each server then generates $\sigma_i^3 \leftarrow \text{Sign}(sk_i^s, (C_i)_{i \in [1 \ldots n]}, \text{context}, C_m, pk_e')$, provided the maximum amount of login attempts for throttling is not yet reached. For simplicity, we assume that a server aborts the protocol if it sees a protocol message bound to a given $pk_e$ twice. This prevents replay attacks.
5. Each $\sigma_i^3$ is sent to the receiver.
6. The receiver checks the validity of each $\sigma_i^3$.
7. The receiver selects a random number r. Compute $C_A \leftarrow (C_1 \odot \text{TEnc}(pk_t, 1/p'))^r$. Generate a proof $\pi_0 \leftarrow \text{NIZK}\{(p', r): C_A = (C_1 \odot \text{TEnc}(pk_t, 1/p'))^r\}(\text{context}, C_m, pk_e')$.
8. The receiver then sends all $((\sigma_i^3)_{i \in [1 \ldots t]}, C_A, \pi_0)$ to all t servers.
9. Each server verifies the validity of each received $\sigma_i^3$ and $\pi_0$. If any checks fail, abort.
10. Each server then re-randomizes the encryption, i.e., it computes $C_i' \leftarrow C_A^{r_i}$ for a random $r_i$. It also computes a proof $\pi_{i,1} \leftarrow \text{NIZK}\{(r_i'): C_i' = C_A^{r_i}\}$ (context, $pk_e'$, $C_A$). The servers also sign $\sigma_i^4 \leftarrow \text{Sign}(sk_i^s, (C_i)_{i \in [1 \ldots t]}, C_A, C_i', \pi_0, \pi_{i,1}$ context, $pk_e'$)).
11. Each server $S_i$ sends $\sigma_i^4$, $\pi_{i,1}$ and $C_i'$ to the receiver.
12. The receiver verifies all signatures, and proofs.
13. The receiver sends all $(\sigma_i^4)_{i \in [1 \ldots t]}, (\pi_{i,1})_{i \in [1 \ldots t]}$, and $C_i'$ to each server.
14. Server $S_i$ checks the signatures, and the proofs. If all are valid, it computes $C_A' \leftarrow \odot C_i'$, and also a first decryption share $(d_i, \pi_{d, i}) \leftarrow \text{PDec}(sk_i^t, C_A')$.
15. Each server computes: $\sigma_i^5 \leftarrow \text{Sign}(sk_i^s, (C_i)_{i \in [1 \ldots t]}, C_A, C_i', C_A', \pi_{i,1}, (d_i, \pi_{d, i}), \text{context}, pk_e'))$.
16. Each server sends $\pi_i^5$, $C_A'$, and $(d_i, \pi_{d,i})$ to the receiver.
17. The receiver checks the validity of the shares, proofs, signatures, and then also checks that $\text{TDec}(C_A', \{d_0\}_{0 < i \leq t}) = 1$.
18. If so, the receiver sends $\sigma_i^5$, $C_A'$, and $(d_i, \pi_{d,i})$ to each server.
19. Each server checks the validity of the shares, proofs, signatures, and then also checks that $\text{TDec}(C_A', \{d_i\}_{0 < i \leq t}) = 1$. Signal that login-attempt for that context was correct.
20. If so, each server computes a second decryption share $(d_i', \pi_{d',i}) \leftarrow \text{PDec}(sk_i^t, C_m)$.
21. Each server encrypts $C_{i,e} \leftarrow \text{EEnc}(pk_e', (d_i, \pi_{d',i})\text{context})$.
22. Each server signs $\sigma_i^6 \leftarrow \text{Sign}(sk_i^s, (C_{i,e}, \text{context}, pk_e'))$ and sends it to the receiver.
23. The receiver verifies each $\sigma_i^6$ and decrypts each $(d_i', \pi_{d',t})$. It then verifies each $d_i'$ using VfPDec. Finally, it outputs $m \leftarrow \text{TDec}(C_{i,e}, \{d_i'\}_{0 < i \leq t})$.

It can be seen that the message data and the password remain hidden due to the threshold encryption, provided not more than t out of the n servers are adversarial. All password attempts are re-randomized. The servers do not need to be synchronized, and no non-server PKI is needed. Neither sender nor receiver require any prior communication with each other, or to store any cryptographic material. The scheme can be implemented transparently to provide a secure email service or other secure data transfer service, e.g. for retrieval of data by the same sender/receiver. The scheme may also be applied for secure communication of keys for encryption/decryption of subsequent messages via a symmetric cipher.

Many changes and modifications can of course be made to the exemplary embodiments described. For example, we could require that the communication channel is completely encrypted in the above implementation, so that an outsider does not learn which data is requested, and which party actually requests something. This would also hide the receiver identity from outsiders. A sender could also receive confirmation that the servers have stored the encrypted message, e.g., by replying with a signature on the ciphertext $C_m$. Password updates can be done similarly to setup, where an old password is replaced with an encryption of a new password provided that the password attempt for the old password is correct.

Embodiments might also be envisaged where the $C_m$ are stored in association with receiver IDs by the servers. On successful authentication of a receiver, any (or all) $C_m$ stored for his id may then be selected for decryption. Also, while the receiver ID contains server IDs for convenience above, server IDs might be otherwise published and available to sender/receivers as required. However, even a standard e-mail address nowadays contains some server identifier, so there is no loss in including server identifiers in receiver IDs. Server IDs might also be made public so that any receiver can readily determine which servers to use. Alternatively, if at least one honest server is contacted it can respond with the list of servers.

Steps of flow diagrams may be performed in a different order to that shown, and some steps may be performed concurrently as appropriate. Also, in steps where a computer communicates separately with individual servers $S_i$, in some cases such communications might be sent to any server for distribution to other servers as appropriate. Embodiments might also be envisaged where first decryption shares are distributed (authentically) between the t servers $S_i$ by server-server communication, whereby password verification at the receiver may be omitted.

The first and second ciphertexts can be constructed in various ways to obtain the quotient p/p' (or alternatively p'/p) via the function F discussed above, and values V other than unity may be used in some instances. The homomorphic property of the encryption scheme can also be based on group operations "." other than multiplication. In general, values produced using specified elements may include further elements if desired.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising n≥2 servers $S_i$, 1≤i≤n, for communicating messages between sender and receiver computers, connectable to said system via a network, in dependence on authentication of receiver passwords, associated with respective receiver IDs, by the system, wherein each server $S_i$ comprises at least one hardware data processor connected with at least one memory that stores software instructions, and wherein execution of the software instructions by the at least one hardware data processor causes each server $S_i$:

to store, for each said receiver ID, a first ciphertext produced by encrypting the receiver password associated with that ID under a respective public key via a homomorphic threshold encryption scheme having a threshold t≤n, and a key-share $sk_i$ of a secret key corresponding to that public key;

in response to receipt from a sender computer of an encrypted message, produced by encrypting a message for a said receiver ID under the public key for that ID via said encryption scheme, to store the encrypted message;

in response to receipt from a receiver computer of a said receiver ID, to send said first ciphertext for that ID to the receiver computer and, following receipt from the receiver computer of an authentication value which comprises a predetermined function of that first ciphertext and a second ciphertext produced by encrypting a password attempt under the public key for that ID via said encryption scheme such that the authentication value decrypts to a predetermined value if the password attempt equals the receiver password for that ID, to produce a first decryption share dependent on the authentication value using said key-share $sk_i$ for that ID; and in response to receipt of said first decryption share produced by each of (t−1) other servers $S_j$ for the authentication value received for said ID, to determine from the t first decryption shares whether the authentication value decrypts to said predetermined value and, if so, to produce a second decryption share of a selected encrypted message using said key-share $sk_i$ for that ID, and to send the second decryption share to said receiver computer.

2. A system as claimed in claim 1 wherein each server $S_i$ is further caused, in a setup operation for a said receiver ID, to receive that receiver ID, said respective public key, said key-share $sk_i$, and said first ciphertext from a receiver computer.

3. A system as claimed in claim 2 wherein each server $S_i$ is further caused to store said public key for each receiver ID and, in response to receipt from a sender computer of a said receiver ID, to send the public key for that ID to the sender computer.

4. A system as claimed in claim 2 wherein each server $S_i$ is further caused to store said public key for each receiver ID and, in response to receipt from a receiver computer of a said receiver ID, to send the public key for that ID to the receiver computer.

5. A system as claimed in claim 1 wherein each server $S_i$ is further caused to send said first decryption share to the receiver computer and to receive from the receiver computer said first decryption share produced by each of the (t−1) other servers $S_j$.

6. A system as claimed in claim 1 wherein each server $S_i$ is further caused to receive a session public key from said receiver computer supplying said receiver ID, and to encrypt said first decryption share under said session public key.

7. A system as claimed in claim 1 wherein each server $S_i$ is further caused to publish at least a portion of said encrypted message received from said sender computer.

8. A system as claimed in claim 7 wherein each server $S_i$ is further caused to receive at least said portion of said selected encrypted message from said receiver computer.

9. A system as claimed in claim 6 wherein each server $S_i$ is further caused, in response to determination that said authentication value decrypts to said predetermined value, to send, encrypted under said session public key, at least a portion of each encrypted message stored by that server $S_i$ to said receiver computer, and, in response to selection of a said encrypted message by the receiver computer, to produce said second decryption share of that encrypted message.

10. A system as claimed in claim 1 wherein said predetermined function and said first and second ciphertexts are constructed such that said authentication value encrypts a quotient of the user password and the password attempt via said encryption scheme.

11. A system as claimed in claim 10 wherein said predetermined value is one, and wherein the authentication value comprises said predetermined function of the first and second ciphertexts blinded with a random exponent r.

12. A system as claimed in claim 11 wherein each server $S_i$ is further caused:

in response to receipt of the authentication value from said receiver computer, to produce a blinded value by blinding the authentication value with a random exponent $r_i$, and to send the blinded value to the receiver computer;

to receive from the receiver computer said blinded value produced by each of said (t−1) other servers $S_j$ and to combine the t blinded values to produce a randomized authentication value; and to produce said first decryption share by decrypting the randomized authentication value using said key-share $sk_i$.

13. A system as claimed in claim 1 including at least one receiver computer, the receiver computer being adapted:

in response to receipt of said first ciphertext for a receiver ID and input of a password attempt for that ID, to produce said second ciphertext by encrypting the password attempt under the public key for that ID via said encryption scheme, to produce the authentication value comprising said predetermined function of the first ciphertext and the second ciphertext, and to send the authentication value to t servers $S_i$; and in response to receipt of said second decryption share produced by each of said t servers $S_i$, to use the t second decryption shares to decrypt the selected encrypted message via a decryption algorithm of said encryption scheme.

14. A system as claimed in claim 13 wherein said receiver computer is further adapted to produce the authentication value by blinding said predetermined function of the first and second ciphertexts with a random exponent r.

15. A system as claimed in claim 13 wherein said receiver computer is further adapted, in a setup operation for a said receiver ID, to generate for that ID said public key and said key-share $sk_i$ for each server $S_i$, and, in response to input of a receiver password for that ID, to produce the first ciphertext by encrypting the receiver password under the public key via said homomorphic threshold encryption scheme, to send the receiver ID, the first ciphertext and the public key to said servers $S_i$, and to send the key-shares $sk_i$ to respective servers $S_i$.

16. A method for use in communicating messages between sender and receiver computers, connectable via a network to a system of n≥2 servers $S_i$, 1≤i≤n, in dependence on authentication of receiver passwords, associated with respective receiver IDs, by said system, wherein each of the servers comprise at least one hardware data processor and at least one memory, the method comprising, at each server $S_i$:
  storing, for each said receiver ID, a first ciphertext produced by encrypting the receiver password associated with that ID under a respective public key via a homomorphic threshold encryption scheme having a threshold t≤n, and a key-share $sk_i$ of a secret key corresponding to that public key;
  in response to receipt from a sender computer of an encrypted message, produced by encrypting a message for a said receiver ID under the public key for that ID via said encryption scheme, storing the encrypted message;
  in response to receipt from a receiver computer of a said receiver ID, sending said first ciphertext for that ID to the receiver computer and, following receipt from the receiver computer of an authentication value which comprises a predetermined function of that first ciphertext and a second ciphertext produced by encrypting a password attempt under the public key for that ID via said encryption scheme such that the authentication value decrypts to a predetermined value if the password attempt equals the receiver password for that ID, producing a first decryption share dependent on the authentication value using said key-share $sk_i$ for that ID; and
  in response to receipt of said first decryption share produced by each of (t−1) other servers $S_i$ for the authentication value received for said ID, determining from the t first decryption shares whether the authentication value decrypts to said predetermined value and, if so, producing a second decryption share of a selected encrypted message using said key-share $sk_i$ for that ID, and sending the second decryption share to said receiver computer.

17. A method as claimed in claim 16 including, at the server $S_i$:
  receiving, in a setup operation for a said receiver ID, that receiver ID, said respective public key, said key-share $sk_i$, and said first ciphertext from a receiver computer and further storing said public key for that ID;
  in response to receipt from a sender computer of a said receiver ID, sending the public key for that ID to the sender computer; and
  in response to receipt from a receiver computer of a said receiver ID, sending the public key for that ID to the receiver computer.

18. A method as claimed in claim 16 including, at the server $S_i$, sending said first decryption share to the receiver computer and receiving from the receiver computer said first decryption share produced by each of said (t−1) other servers $S_i$.

19. A method for receiving a message from a sender computer via a network in dependence on authentication of a receiver password, associated with a receiver ID, by a system of n≥2 servers $S_i$, 1≤i≤n, in said network, wherein each server $S_i$ stores for said receiver ID a first ciphertext produced by encrypting said receiver password under a public key via a homomorphic threshold encryption scheme having a threshold t≤n, and a key-share $sk_i$ of a secret key corresponding to that public key, and further stores an encrypted message, received from the sender computer, produced by encrypting said message under said public key via said encryption scheme, wherein each server comprises at least one hardware data processor and at least one memory, the method comprising, at a receiver computer:
  sending the receiver ID to said system of servers;
  in response to receipt, from said system of servers, of said first ciphertext and input of a password attempt for the receiver ID, producing a second ciphertext by encrypting the password attempt under said public key via said encryption scheme and producing an authentication value comprising a predetermined function of the first ciphertext and the second ciphertext such that the authentication value decrypts to a predetermined value if the password attempt equals the receiver password;
  sending the authentication value to t servers $S_i$ for production, at respective servers, of t first decryption shares dependent on the authentication value using respective key-shares $sk_i$ of the t servers and determination at the t servers, from the t first decryption shares, whether the authentication value decrypts to said predetermined value;
  receiving from each of said t servers $S_i$ a second decryption share of said encrypted message produced by that server $S_i$ using the key-share $sk_i$ thereof; and
  using the t second decryption shares to decrypt the encrypted message via a decryption algorithm of said encryption scheme.

* * * * *